US012613880B2

(12) United States Patent
Appleyard et al.

(10) Patent No.:     US 12,613,880 B2
(45) Date of Patent:       Apr. 28, 2026

(54) DOMAIN SPECIFIC LANGUAGE FOR DATA PIPELINE CREATION

(71) Applicant: Matillion Limited, Salford (GB)

(72) Inventors: Robert John Appleyard, Manchester (GB); Mark Bryan Davies, Woodmancote (GB); Samuel Thomas Perrin, Lincoln (GB)

(73) Assignee: Matillion Limited, Salford (GB)

( * ) Notice: Subject to any disclaimer, the term of this patent is extended or adjusted under 35 U.S.C. 154(b) by 0 days.

(21) Appl. No.: 18/675,915

(22) Filed: May 28, 2024

(65) Prior Publication Data

US 2025/0371024 A1     Dec. 4, 2025

(51) Int. Cl.
*G06F 16/25*          (2019.01)
(52) U.S. Cl.
CPC ................................. *G06F 16/254* (2019.01)
(58) Field of Classification Search
CPC .................................................... G06F 16/254
USPC ......................................................... 707/602
See application file for complete search history.

(56) References Cited

U.S. PATENT DOCUMENTS

| | | | | |
|---|---|---|---|---|
| 2007/0201673 | A1* | 8/2007 | Annadata ............ | H04M 3/5235 |
| | | | | 379/265.01 |
| 2019/0332963 | A1* | 10/2019 | Wong ..................... | G06N 20/00 |
| 2021/0097684 | A1* | 4/2021 | Mellen ................... | G16B 15/00 |
| 2021/0255917 | A1* | 8/2021 | Reitbauer ........... | G06F 11/3409 |
| 2023/0015186 | A1* | 1/2023 | James ............... | G06F 16/24542 |
| 2024/0202208 | A1* | 6/2024 | Van Haren .............. | G06F 16/26 |

* cited by examiner

*Primary Examiner* — Muluemebet Gurmu
(74) *Attorney, Agent, or Firm* — Gilliam IP PLLC

(57)          ABSTRACT
A domain specific language, the "data pipeline language" (DPL), has been developed for programmatic creation of data pipelines for ETL/ELT with a human-readable format. The DPL syntax is abstracted from the specific technologies used for building a data pipeline, so the DPL that defines various components of a data pipeline (e.g., data sources, data warehouses, and/or cloud-based processing components) is independent of the specific vendors used to provide these components. A user that defines a data pipeline in the DPL specifies any external vendors that will be leveraged for execution of the data pipeline in a configuration file. During execution of a data pipeline defined in with the DPL, a pipeline execution platform maps data pipeline components identified from the DPL file to the respective external vendor(s) indicated in the configuration and "translates" the DPL components into their corresponding commands that are sent to the external vendor(s).

20 Claims, 5 Drawing Sheets

GENERATE COMMAND FOR AN EXTERNAL VENDOR TO PERFORM AN ACTION CORRESPONDING TO EXECUTION OF A DATA PIPELINE COMPONENT

401 — DETERMINE COMMAND TYPE BASED ON COMPONENT TYPE AND EXTERNAL VENDOR

403 — DETERMINE PARAMETER VALUE(S) FOR THE COMMAND BASED ON THE COMPONENT PROGRAM CODE

405 — COMMUNICATE COMMAND AND THE PARAMETER VALUE(S) TO THE EXTERNAL VENDOR

END

DOMAIN SPECIFIC LANGUAGE FOR DATA PIPELINE CREATION

BACKGROUND

The disclosure generally relates to electric digital data processing and information retrieval (e.g., CPC subclass G06F/00) and ETL procedures (e.g., CPC subclass CPC G06F/254).

ETL (extract, transform, load) is a data integration process that was introduced in the 1970s. The ETL process extracts data from multiple data sources, cleans and organizes (i.e., transforms) the extracted data for the intended use and/or target system, and loads the transformed data into a target system (e.g., data warehouse or data lake). ELT (extract, load, transform) is a similar data integration process that defers transformation until after the extracted raw data has been loaded into the target system.

The rise of cloud computing has introduced "ETL pipelines" or "data pipelines." ETL pipeline refers to the implementations or collection of processes and tools for ETL in a cloud computing environment that involves not only multiple data sources but heterogeneous data sources. In some cases, "cloud ETL" or "cloud ELT" is used instead of data pipeline. While "data pipeline" and "ETL pipeline" are sometimes used interchangeably, some use "data pipeline" to refer more specifically to a data integration process that includes streaming data sources or "real-time" data sources. However, it is more common for data pipelines to refer to the processes and tools that collectively implement ETL regardless of the data sources being streaming or "real-time" data sources. "Data pipeline" suggests the flow of data over a pipeline from sources, through a series of processing steps or components that implement the processing steps, to a destination or sink.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Introduction

To build a data pipeline via a graphical user interface (GUI), a user interacts with a GUI of a tool/orchestrator to arrange (e.g., drag and drop icons/symbols) and configure various data pipeline components, such as data source, data sink, and processing components. This can include configuring third-party/externally hosted and managed technologies to be used for various components. For instance, a user can configure a data warehouse offered by a third-party vendor as a data sink for a data pipeline.

Overview

A domain specific language, referred to as the "data pipeline language," has been developed for programmatic creation of data pipelines for ETL/ELT with a human-readable format. The data pipeline language syntax is abstracted from the specific technologies used for building a data pipeline, including those offered by external vendors, which thus increases portability of files that define the data pipelines since these files are not tied to the specific vendors used by the pipeline defined therein. Specifically, data pipelines can use data sources, data warehouses, and/or cloud-based processing components offered by external vendors, and the data pipeline language that defines these various components is independent of the specific vendors used to provide these components. A user that defines a data pipeline in the data pipeline language specifies any external vendors that will be leveraged for execution of the data pipeline in a configuration file of the data pipeline, and changes to vendors being used do not affect the definition of the pipeline in terms of the data pipeline language itself.

With the data pipeline language, pipelines are described with structured data comprising attribute-value pairs. A pipeline execution platform obtains the data pipeline configuration (e.g., a configuration file) and the data pipeline language file of a data pipeline. During execution of the data pipeline, the pipeline execution platform maps the attribute values of the data pipeline components identified from the data pipeline language file to the specific data source, data warehouse, processing component, etc. that are indicated in the configuration and effectively "translates" the data pipeline language components into their corresponding commands that are sent to the external vendor during execution of the data pipeline. The data pipeline language is also human-readable, with components defined in the data pipeline language corresponding directly to GUI elements seen by the end user when configuring and defining a data pipeline using the language.

Example Illustrations

Figure 1:
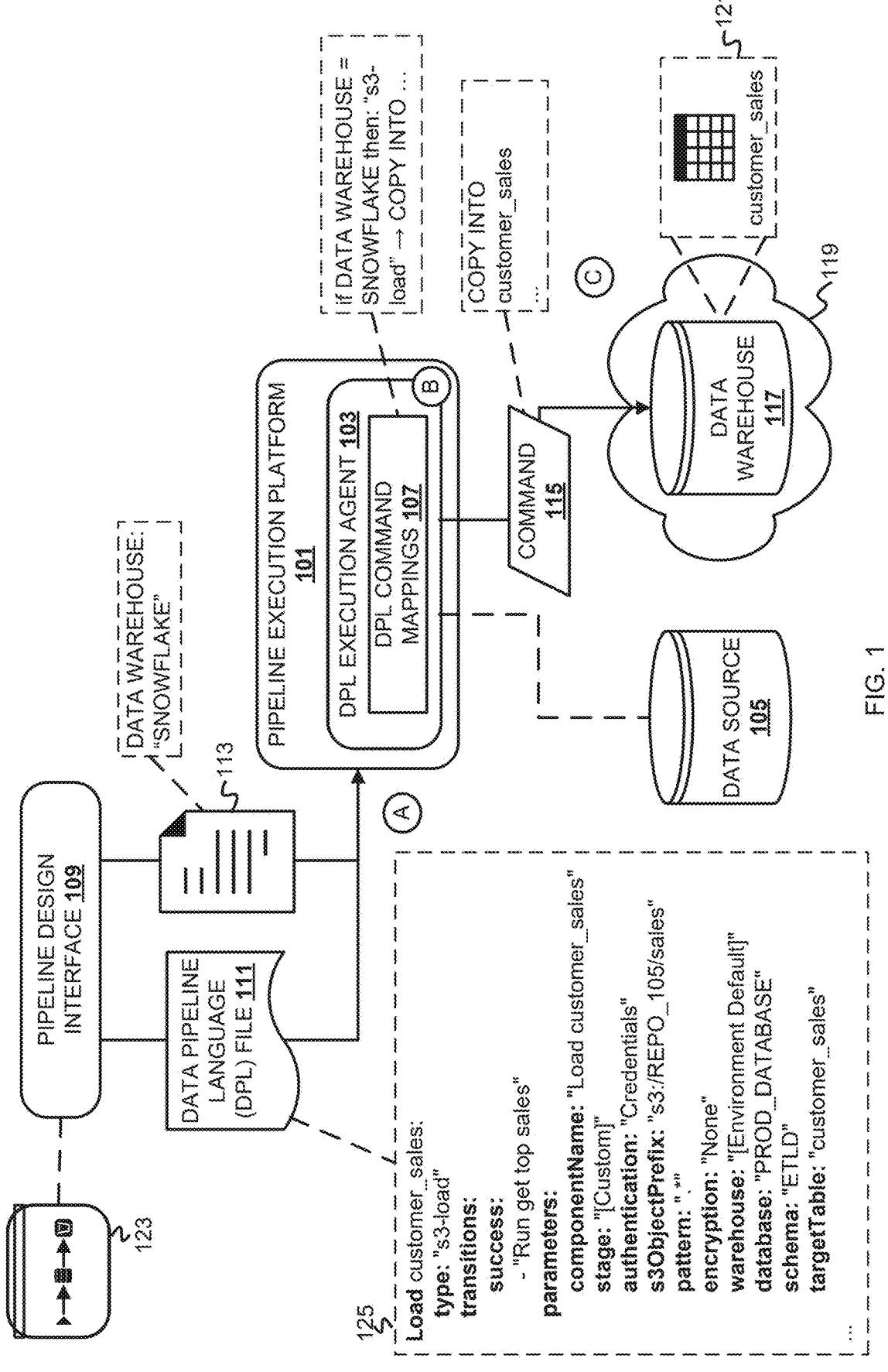
FIGS. 1 and 2 are conceptual diagrams of processing and executing data pipelines written in the data pipeline language.
Figure 2:
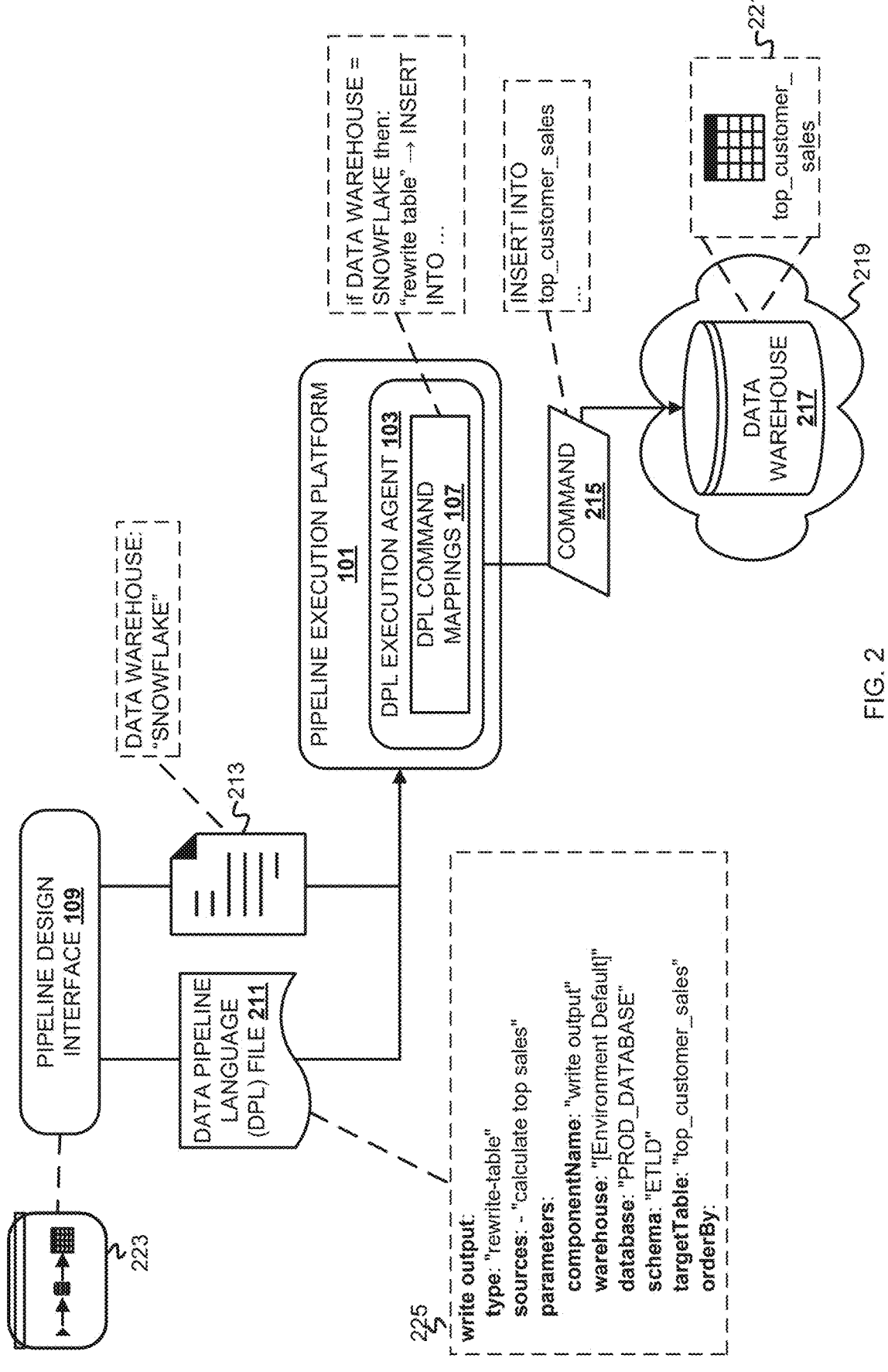

FIGS. 1 and 2 are conceptual diagrams of executing data pipelines written in the data pipeline language. A pipeline design interface 109 comprises a GUI by which data pipelines can be built. FIG. 1 depicts an example GUI depiction of a data pipeline 123, which includes various icons that represent different stages of the data pipeline 123. A pipeline execution platform 101 obtains data pipeline files (e.g., from a data pipeline repository) that define data pipelines created via the pipeline design interface 109 and executes the data pipelines. The pipeline execution platform 101 may be hosted in the cloud and can interact with various third-party technologies that are used as data sources, data warehouses, etc. in data pipelines. A data pipeline language execution agent ("DPL execution agent") 103 executes as part of the pipeline execution platform 101 and processes data pipeline files written in the data pipeline language. FIG. 1 depicts an example of the DPL execution agent 103 executing a data load written in the data pipeline language, while FIG. 2 depicts an example of the DPL execution agent 103 executing a data transformation written in the data pipeline language.

In FIG. 1, a data pipeline language file ("DPL file") 111 comprises an example programmatic definition of the data pipeline 123 written in the data pipeline language. The DPL file 111 comprises structured data with attribute-value pairs that may be based upon a file format generally used for structured data, such as YAML Ain't Markup Language (YAML) or JavaScript Object Notation (JSON). The DPL file 111 comprises an example component 125 named "Load customer_sales", which includes a plurality of parameters. In the data pipeline language, a component corresponds to a programmatic definition of an icon depicted on the GUI via which a data pipeline can be built. Data pipeline components depicted in the GUI can be customized via the parameter values specified with the data pipeline language. The program code of the component 125 specifies a load of data into a table named "customer_sales" as indicated by the "target-Table" parameter value. On success of the load, the data pipeline transitions to a component named "Run get top sales". Example data pipeline language with which components for data loading such as the component 125 are defined is provided below.

```
Load customer_sales:
    type: "s3-load"
    transitions:
        success:
        "Run get top sales"
    parameters:
        componentName: "Load customer_sales"
        stage: "[Custom]"
        authentication: "Credentials"
        s3ObjectPrefix: "s3:/REPO_105/sales"
        pattern: ".*"
        encryption: "None"
        warehouse: "[Environment Default]"
        database: "PROD_DATABASE"
        schema: "ETLD"
        targetTable: "customer sales"
        format: "[Custom]"
        file Type: "CSV"
        compression: "AUTO"
        skipHeader: "1"
        skipBlankLines: "False"
        escapeUnenclosedField:
        trimSpace: "False"
        fieldOptionallyEnclosed: "\"
        errorOnColumnCountMismatch: "False"
        emptyFieldAsNull: "True"
        replaceInvalidCharacters: "False"
        onError: "Abort Statement"
        purgeFiles: "False"
        truncateColumns: "False"
        forceLoad: "False"
```

An end user that has created the data pipeline 123 via the pipeline design interface 109 has also configured one or more third-party technologies that are to be used when executing the data pipeline 123. Examples of third-party technologies include data sources (e.g., repositories), data sinks (e.g., data warehouses), and processing components offered by cloud service providers (CSPs). Configuration information of the data pipeline 123 is indicated in a configuration file 113. In this example, the configuration file 113 indicates that the Snowflake® data warehouse has been specified as a data warehouse to be used for the data pipeline 123. This example depicts a data warehouse 117 that is assumed to correspond to the data warehouse specified in the configuration file 113. The configuration file 113 may further indicate an application programming interface (API) endpoint of the data warehouse 117.

FIG. 1 is annotated with a series of numbers/letters A-C. Each letter represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the pipeline execution platform 101 obtains the DPL file 111 and the configuration file 113. The pipeline execution platform 101 can obtain the DPL file 111 and/or the configuration file 113 from a repository(ies) upon receiving an indication to run the data pipeline 123. For instance, a user can select a command to run the data pipeline 123 via a GUI on which the visualization of the data pipeline 123 is depicted, which communicates an instruction to the pipeline execution platform 101 to run the data pipeline 123. As another example, configuration files may be stored in a datastore (e.g., repository) external to but accessible by the pipeline execution platform 101, and the pipeline execution platform 101 reads from the configuration file 113 stored in this location based on obtaining the DPL file 111.

At stage B, the DPL execution agent 103 processes the DPL file 111 based on DPL command mappings ("mappings") 107 as part of executing the data pipeline 123. The mappings 107 indicate mappings of data pipeline language attribute-value pairs to corresponding commands that are specific to various third-party technologies. When executing components of DPL files, which involves traversing the components defined therein based on transitions between components from a starting component, the DPL execution agent 103 determines whether each component corresponds to a third-party technology. For instance, the DPL execution agent 103 can determine if a command should be sent to a third-party technology as part of executing a component based on values specified in the configuration file 113 and component types indicated in a corresponding attribute-value pair. In this example, the mappings 107 indicate that if the Snowflake data warehouse has been configured as the data warehouse for a pipeline, a component with the type "s3-load" should be mapped to a "COPY INTO" command that is sent to the compatible data warehouse (i.e., hosted by the Snowflake platform). Because the component 125 has a type of "s3-load" and the configuration file 113 indicates that the Snowflake data warehouse should be used for the data pipeline 123, the DPL execution agent 103 maps the component 125 to a "COPY INTO" command to be sent to a Snowflake data warehouse. In other examples, the DPL execution agent 103 can check values of one or more attributes for a component to determine if the values are indicative that a command should be communicated externally as part of executing the component. Examples of attributes that the DPL execution agent 103 can perform value checks for include "warehouse" and/or "database" attributes. The DPL execution agent 103 can be configured to recognize values that are indicative that such an external command should be executed.

At stage C, the DPL execution agent 103 sends a command 115 to the data warehouse 117 based on the corresponding component 125 of the DPL file 111. The DPL execution agent 103 constructs the command 115 based on determining that the component 125 maps to a "COPY INTO" command that is compatible with Snowflake data warehouses. The command 115 can be an API call that comports to the Snowflake API for data warehouses. To construct the command 115, the DPL execution agent 103 can further extract one or more parameters values from the component 125 (i.e., one or more attribute-value pairs indicated as values of the "parameters" attribute) and incorporate the parameters as parameter values in an API call to be sent to the data warehouse 117. Extracting parameter values from the component 125 refers to copying attribute values from the component for insertion into the command 115 as respective parameter values. For instance, the DPL execution agent 103 can extract the value of the "target-Table" attribute, or "customer_sales", and insert this value into the command 115 that it generates. The DPL execution agent 103 can also extract an indication of a data source 105 (e.g., the "PROD_DATABASE" database indicated in the component 125) and include the indication of the data source 105 in the command 115. Parameter values to be extracted from components and inserted into respective commands can be specified in the respective ones of the mappings 107. The DPL execution agent 103 communicates the command 115 (e.g., via an API invocation) to the data warehouse 117 to execute the data load specified by the component 125. Upon receiving the command 115, the "COPY INTO" action can be executed at the data warehouse 117 to copy data into a table 121 named "customer_sales."

The DPL execution agent 103 can also wait for a response to the command 115 indicating a success before continuing to execute the data pipeline 123. Expected responses indicating success can be configured in the DPL execution agent 103 based on request-response patterns indicated in API specifications of the third-party technologies with which the DPL execution agent 103 is compatible (i.e., has been configured to use). For this example, on success of the command 115 executing, the data pipeline 123 transitions to the component named "Run get top sales" (not depicted in FIG. 1 for simplicity).

Turning to FIG. 2, this example depicts the pipeline execution platform 101 as obtaining a data pipeline language file ("DPL file") 211. The DPL file 211 comprises an example programmatic definition of a data pipeline 223 written in the data pipeline language. The DPL file 211 comprises an example component 225 named "write output", which includes a plurality of parameters like the component 125 of FIG. 1. The program code of the component 225 specifies a data transformation where the output is to be written into a table named "top_customer_sales" as indicated by the "targetTable" parameter value. Example data pipeline language with which components for data transformations such as the component 225 are defined is provided below.

```
write output:
    type: "rewrite-table"
    sources: —"calculate top sales"
    parameters:
        componentName: "write output"
        warehouse: "[Environment Default]"
        database: "PROD_DATABASE"
        schema: "ETLD"
        targetTable: "top_customer_sales"
        orderBy:
```

An end user that has created the data pipeline 223 via the pipeline design interface 109 has also configured one or more third-party technologies that are to be used when executing the data pipeline 223. Configuration information of the data pipeline 223 is indicated in a configuration file 213. In this example, the configuration file 213 also indicates that the Snowflake® data warehouse has been specified as a data warehouse to use for the data pipeline 223. Similar to FIG. 1, this example depicts a data warehouse 217 that is assumed to correspond to the data warehouse specified in the configuration file 213. The configuration file 213 can further indicate an API endpoint of the data warehouse 217. Execution of the data pipeline 223 and mapping of data pipeline language to commands sent to third-party technologies by the DPL execution agent 103 is performed as similarly described in reference to FIG. 1, though an abbreviated description is provided to aid in understanding.

The pipeline execution platform 101 obtains the DPL file 211 and the configuration file 213, such as based on receiving an indication to run the data pipeline 123. The DPL execution agent 103 processes the DPL file 211 based on the mappings 107 as part of executing the data pipeline 223. In this example, the mappings 107 indicate that if the Snowflake data warehouse has been configured as the data warehouse for a pipeline, a component with the type "rewrite-table" should be mapped to a "INSERT INTO" command that is sent to the compatible data warehouse. Because the component 225 has a type of "rewrite-table" and the configuration 213 indicates that the Snowflake data warehouse should be used for the data pipeline 223, the DPL execution agent 103 maps the component 225 to a "INSERT INTO" command to be sent to a Snowflake data warehouse. The DPL execution agent 103 constructs a command 215 based on the corresponding component 225 of the DPL file 211. The DPL execution agent 103 can extract one or more parameters values from the component 225 and incorporate the parameters as parameter values in an API call to be made to the data warehouse 217, such as the value of the "target-Table" attribute, or "top_customer_sales." The DPL execution agent 103 communicates the command 215 to the data warehouse 217 to execute the data transformation specified by the component 225. Upon receiving the command 215, the "INSERT INTO" command that is compatible with Snowflake data warehouses is executed at the data warehouse 217. A result of executing the command 215 yields a table 221 named "top_customer_sales."

FIGS. 1 and 2 depict examples of components defined with the data pipeline language. Data pipeline language files such as the DPL files 111, 211 can comprise additional attribute-value pairs in addition to components. An example attribute included in data pipeline language files is a "type" attribute indicating whether the pipeline or individual components correspond to orchestration jobs or transformation jobs. Another example attribute is a "variables" attribute defined for the pipeline and/or its components. Variables that can be defined for a respective component include metadata attributes. Variable attributes can be leveraged to allow end users to change or overwrite values defined at runtime (e.g., default values). Data pipeline language files can also comprise a "design" attribute with values indicating attributes of component design, such as coordinates corresponding to positioning of an icon representing the component on a GUI, and/or notes that can be rendered on the GUI during or as a result of pipeline execution. Additionally, while each of FIGS. 1 and 2 depict an example component definition in the data pipeline language, data pipeline language files generally include definitions of a plurality of components. These components can be values themselves of a "pipeline" attribute (e.g., with nesting of attribute-value pairs).

While not depicted in FIGS. 1 and 2, in implementations, a foundation model (e.g., a pre-trained large language model (LLM)) can be leveraged to generate natural language descriptions of data pipelines defined in data pipeline language files or to generate data pipeline language files or templates thereof for definition of data pipelines. To illustrate, a prompt comprising a data pipeline language file and an instruction to generate a description of the data pipeline can be generated (e.g., with a prompt template) and input into a foundation model to obtain as output a natural language description of the data pipeline. The prompt also includes one or more examples of data pipeline language definitions of components and descriptions thereof. The prompt can further indicate one or more attributes defined for the data pipeline language and descriptions thereof (e.g., a "transition" attribute and a description indicating that the attribute value indicates a next component(s) to execute in the data pipeline). Conversely, a prompt comprising a natural language description of a data pipeline and an instruction to create a data pipeline language representation of the data pipeline can be created and input to a foundation model to obtain as output a data pipeline language file or file template (e.g., with empty or placeholder attribute values, such as for parameters) representing the data pipeline. Such prompts for this case can include examples of data pipelines defined with data pipeline language and corresponding natural language descriptions thereof.

Figure 3:
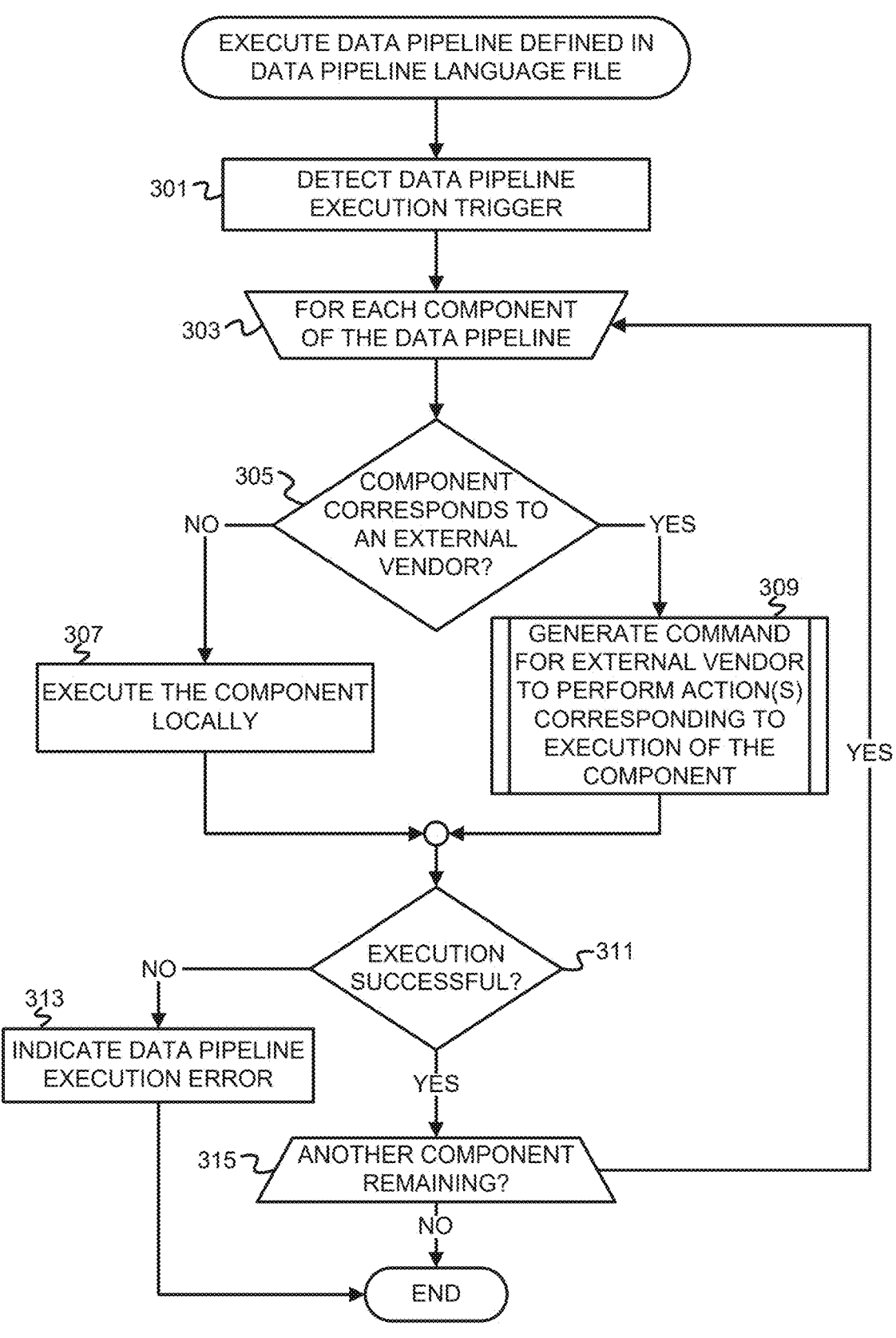
FIG. 3 is a flowchart of example operations for executing a data pipeline defined in a data pipeline language file.
Figure 4:
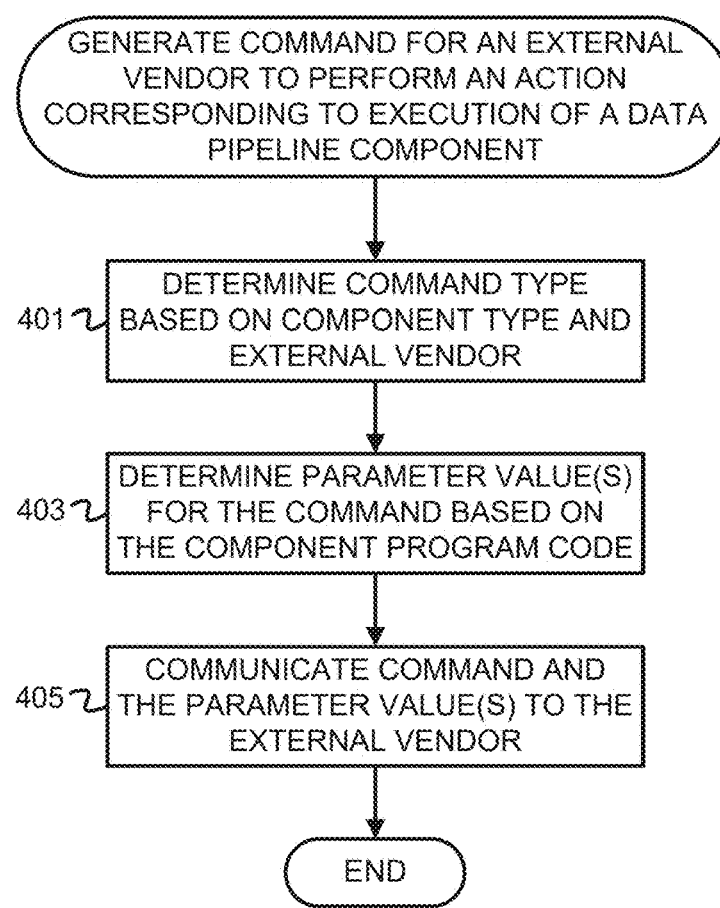
FIG. 4 is a flowchart of example operations for generating a command for an external vendor to perform an action corresponding to execution of a data pipeline component.

FIGS. 3-4 are flowcharts of example operations. The example operations are described with reference to a data pipeline language execution agent (hereinafter simply the "execution agent" for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for executing a data pipeline defined in a data pipeline language file. The data pipeline language file comprises program code (i.e., the data pipeline language) definitions of a plurality of data pipeline components. Each component can have a corresponding representation on a GUI depiction of the data pipeline that a user has created.

At block 301, the execution agent detects a data pipeline execution trigger. Execution of the data pipeline may be triggered based on selection of a GUI element by a user, for instance, such as a "start" or "run pipeline" GUI element. The execution agent can obtain the data pipeline language file (hereinafter "the DPL file") based on execution of the data pipeline being triggered. To illustrate, the execution agent can retrieve the DPL file from a repository. The execution agent also obtains or has access to a configuration of the data pipeline defined by the DPL file, such as in a data store of configuration files.

At block 303, the execution agent begins traversing components of the data pipeline. Execution of the data pipeline includes traversing components of the data pipeline defined in the DPL file. An ordering of components is indicated in the DPL file. For instance, the DPL file can include a "start" or other initial component. Transitions from each component can be defined in attribute-value pairs that identify a next component(s) to which to transition upon successful execution of the component. Subsequent example operations refer to the component currently being executed as "the component," and components can be executed at least partially in parallel or concurrently depending on the structure of the data pipeline defined in the DPL file. For instance, two or more components of a data pipeline can be executed in parallel (e.g., if one component transitions to two separate components that can be executed independent of each other).

At block 305, the execution agent determines if the component corresponds to an external vendor. The execution agent can determine if the component corresponds to an external vendor based on a type of the component and a configuration of the data pipeline (e.g., as indicated in a configuration file). For instance, the execution agent may be configured with rules for determining that components correspond to an external vendor based on evaluation of component types, which are indicated in a respective attribute-value pair of the DPL file, and metadata/data of the data pipeline configuration. The execution agent may thus be preconfigured with associations between component types and one or more external vendors that are supported. If the component does not correspond to an external vendor, operations continue at block 307. If the component corresponds to an external vendor, operations continue at block 309.

At block 307, the execution agent executes the component locally. The execution agent can perform or orchestrate performance of an action(s) to execute the component locally at a pipeline execution platform with which the execution agent is associated.

At block 309, the execution agent generates a command for the external vendor to perform an action(s) corresponding to execution of the component. The execution agent can determine a command to generate based on the component type and external vendor configured for the data pipeline and indicated in the data pipeline configuration. The execution agent can also determine one or more parameter values to include in the command based on the attribute-value pairs of the component defined in the DPL file. The execution agent transmits the command to the external vendor, such as via an API call. The execution agent may be configured with indications of API endpoints for supported external vendors and the corresponding API function for each respective component type. Generating a command for an external vendor as part of execution of a data pipeline defined in the data pipeline language is described in further detail in reference to FIG. 4.

At block 311, the execution agent determines if execution of the action corresponding to the component was successful. If a command was sent to an external vendor to execute the component, a response (e.g., an API response) to the command sent to the external vendor should be indicative of whether execution of the command was successful. If the component was executed locally, the determination can be made based on a locally received result or output of component execution. If execution was not successful, operations continue at block 313. If execution was successful, operations continue at block 315.

At block 313, the execution agent indicates a pipeline execution error. The execution agent generates a notification, alert, etc. indicating that there was an error in execution for that component of the data pipeline. Execution of the data pipeline may be terminated upon unsuccessful execution of a component of the data pipeline.

At block 315, the execution agent determines if there is another component of the data pipeline remaining to be executed. If there is another component of the data pipeline remaining, operations continue at block 303. Otherwise, operations are complete.

FIG. 4 is a flowchart of example operations for generating a command for an external vendor to perform an action corresponding to execution of a data pipeline component. The example operations assume that a component has already been determined to correspond to an external vendor.

At block 401, the execution agent determines a command type based on the component type and the external vendor. The execution agent determines the component type based on the value of a respective attribute of the component in the data pipeline language file (e.g., a value of a "type" attribute). The external vendor should be indicated in a configuration file, configuration metadata/data, etc. of the data pipeline. For instance, a configuration file of the data pipeline may enumerate one or more external vendors to be used as providers for one or more respective components of the data pipeline (e.g., for a data warehouse, a data source, a particular processing component(s), etc.). Supported external vendors with which the execution agent is compatible has been predetermined.

At block 403, the execution agent determines one or more parameter values for the command based on the component program code. The component program code, or the data pipeline language with which the component is defined, can comprise one or more parameter values indicated in one or more respective attribute-value pairs. For instance, the component program code can comprise a "parameters" attribute that has one or more attribute-value pairs as a value, where each attribute-value pair corresponds to a parameter and its value. The execution agent determines the parameter value(s) based on the respective attribute(s) of the component indicated in its data pipeline language definition.

At block 405, the execution agent communicates the command and the parameter value(s) to the external vendor. The execution agent can extract the parameter value(s) from the component's definition in data pipeline language and incorporate the parameter values into the command in a format that comports to commands accepted by the external vendor (e.g., according to an API specification of the eternal vendor). The execution agent communicates the command to the external vendor via an API call issued to the external vendor, for instance.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 3, the operations depicted from blocks 303 to 315 can be performed in parallel or concurrently for different components of a data pipeline, such as if the data pipeline includes a transition from one component to two distinct components. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
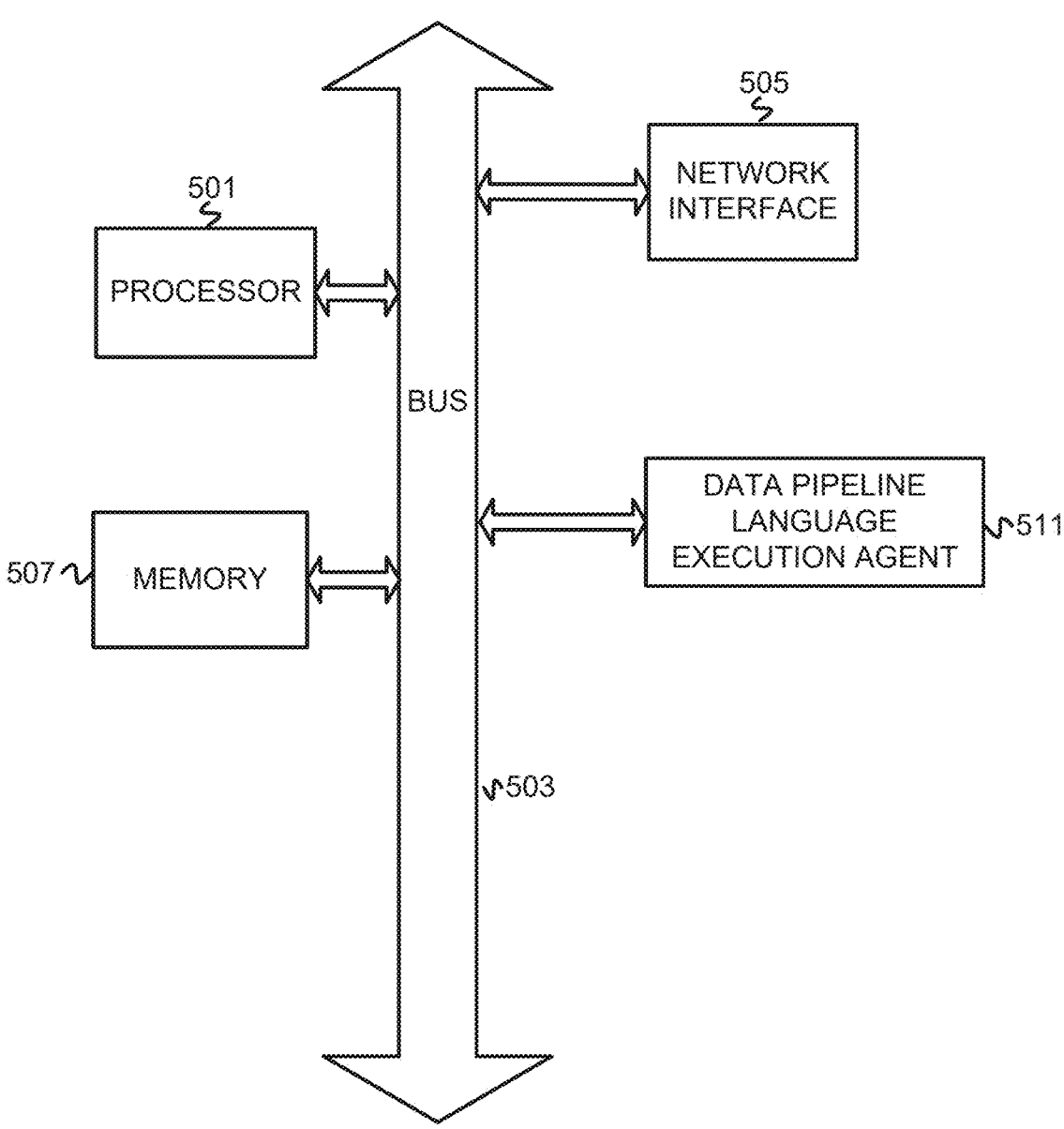
FIG. 5 depicts an example computer system with a data pipeline language execution agent.

FIG. 5 depicts an example computer system with a data pipeline language execution agent. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes data pipeline language execution agent 511. The data pipeline language execution agent 511 executes data pipelines defined in the data pipeline language described herein. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   obtaining a data pipeline file and a configuration file,
      wherein the data pipeline file comprises a definition of
      a data pipeline and indicates a plurality of components,
      wherein the data pipeline is an extract, transform, load
         (ETL) or an extract, load, transform (ELT) data
         pipeline,
      wherein the configuration file indicates mappings
         between types of components included in the data
         pipeline and one or more external vendors to which
         components of the indicated types correspond,
      wherein the definition of the data pipeline comprises
         human-readable syntax abstracted from the one or
         more external vendors; and
   executing the data pipeline, wherein executing the data
      pipeline comprises, for at least a first component of the
      plurality of components of the data pipeline,
      determining that the first component corresponds to at
         least one of a data source, a data warehouse, and a
         processing component of a first external vendor of
         the one or more external vendors based on the
         configuration file and a type of the first component
         indicated in the data pipeline file;
      translating the first component to a first command that
         corresponds to the first external vendor, wherein
         translating the first component to the first command
         comprises mapping the first component to the first
         command based on the type of the first component
         and the mappings between types of components and
         the one or more external vendors indicated in the
         configuration file; and
      communicating the first command to the first external
         vendor to perform one or more actions correspond-
         ing to execution of the first component of the data
         pipeline.

2. The method of claim 1, wherein the data pipeline file comprises structured data, wherein the structured data comprises a plurality of attributes and a corresponding plurality of values, wherein each of the plurality of components comprises a subset of the plurality of attributes and a corresponding subset of the plurality of values.

3. The method of claim 1, wherein communicating the first command to the first external vendor comprises communicating the first command to the first external vendor via an application programming interface (API) of the first external vendor.

4. The method of claim 1, further comprising constructing the first command, wherein constructing the first command comprises determining one or more parameter values indicated in program code of the first component and incorporating the one or more parameter values into the first command.

5. The method of claim 1 further comprising, based on determining that execution of the first command was successful, executing one or more subsequent components of the data pipeline indicated by one or more attributes of the first component, wherein determining that execution of the first command was successful is based on obtaining a response to the first command from the first external vendor.

6. The method of claim 1, further comprising determining that execution of the data pipeline has been triggered based on detecting selection of an element of a graphical user interface (GUI), wherein the GUI comprises a depiction of the data pipeline.

7. One or more non-transitory machine-readable media having program code stored thereon, the program code comprising instructions to:
   obtain a data pipeline file and a configuration file, wherein
      the data pipeline file comprises a definition of a data
      pipeline and indicates a plurality of components,
      wherein the data pipeline is an extract, transform, load
         (ETL) or an extract, load, transform (ELT) data
         pipeline,
      wherein the configuration file indicates mappings
         between types of components included in the data
         pipeline and one or more external vendors to which
         components of the indicated types correspond,
      wherein the definition of the data pipeline comprises
         human-readable syntax abstracted from the one or
         more external vendors; and
   execute the data pipeline, wherein the instructions to
      execute the data pipeline comprise instructions to, for
      at least a first component of the plurality of components
      of the data pipeline,
      determine that the first component corresponds to at
         least one of a data source, a data warehouse, and a
         processing component of a first external vendor of
         the one or more external vendors based on the
         configuration file and a type of the first component
         indicated in the data pipeline file;
      translate the first component to a first command that
         corresponds to the first external vendor, wherein the
         instructions to translate the first component to the
         first command comprise instructions to map the first
         component to the first command based on the type of
         the first component and the mappings between types
         of components and the one or more external vendors
         indicated in the configuration file; and
      communicate the first command to the first external
         vendor to perform one or more actions correspond-
         ing to execution of the first component of the data
         pipeline.

8. The non-transitory machine-readable media of claim 7, wherein the instructions to communicate the first command to the first external vendor comprise instructions to communicate the first command to the first external vendor via an application programming interface (API) of the first external vendor.

9. The non-transitory machine-readable media of claim 7, wherein the program code further comprises instructions to construct the first command, wherein the instructions to construct the first command comprise instructions to determine one or more parameter values indicated in one or one attributes of the first component and incorporate the one or more parameter values into the first command.

10. The non-transitory machine-readable media of claim 7, wherein the program code further comprises instructions to, based on a determination that execution of the first command was successful, execute one or more subsequent components of the data pipeline, wherein the instructions to determine that execution of the first command was successful comprise instructions to determine that execution of the first command was successful based on obtaining a response to the first command from the first external vendor.

11. The non-transitory machine-readable media of claim 7, wherein the data pipeline file comprises structured data, wherein the structured data comprises a plurality of attributes and a corresponding plurality of values, wherein each of the plurality of components comprises a subset of the plurality of attributes and a corresponding subset of the plurality of values.

12. An apparatus comprising:

a processor; and a machine-readable medium having instructions stored thereon that are executable by the processor to cause the apparatus to, obtain a data pipeline file and a configuration file, wherein the data pipeline file comprises a definition of a data pipeline and indicates a plurality of components, wherein the data pipeline is an extract, transform, load (ETL) or an extract, load, transform (ELT) data pipeline, wherein the configuration file indicates mappings between types of components included in the data pipeline and one or more external vendors to which components of the indicated types correspond, wherein the definition of the data pipeline comprises human-readable syntax abstracted from the one or more external vendors; and execute the data pipeline, wherein the instructions to execute the data pipeline comprise instructions to, for at least a first component of the plurality of components of the data pipeline, determine that the first component corresponds to at least one of a data source, a data warehouse, and a processing component of a first external vendor of the one or more external vendors based on the configuration file and a type of the first component indicated in the data pipeline file; and translate the first component to a first command that corresponds to the first external vendor, wherein the instructions executable by the processor to cause the apparatus to translate the first component to the first command comprise instructions executable by the processor to cause the apparatus to map the first component to the first command based on the type of the first component and the mappings between types of components and the one or more external vendors indicated in the configuration file; and communicate the first command to the first external vendor to perform one or more actions corresponding to execution of the first component of the data pipeline.

13. The apparatus of claim 12, wherein the instructions executable by the processor to cause the apparatus to communicate the first command to the first external vendor comprise instructions executable by the processor to cause the apparatus to communicate the first command to the first external vendor via an application programming interface (API) of the first external vendor.

14. The apparatus of claim 12, further comprising instructions executable by the processor to cause the apparatus to construct the first command, wherein the executable by the processor to cause the apparatus to construct the first command comprise instructions executable by the processor to cause the apparatus to determine one or more parameter values indicated by one or more attributes of the first component and incorporate the one or more parameter values into the first command.

15. The apparatus of claim 12, further comprising instructions executable by the processor to cause the apparatus to, based on obtaining a response to the first command from the first external vendor indicating that execution of the first command was successful, execute one or more subsequent components of the data pipeline.

16. The apparatus of claim 12, wherein the data pipeline file comprises structured data, wherein the structured data comprises a plurality of attributes and a corresponding plurality of values, wherein each of the plurality of components comprises a subset of the plurality of attributes and a corresponding subset of the plurality of values.

17. The apparatus of claim 12, further comprising instructions executable by the processor to cause the apparatus to determine that execution of the data pipeline has been triggered based on detection of selection of an element of a graphical user interface (GUI), wherein the GUI comprises a depiction of the data pipeline.

18. The method of claim 1, wherein determining that the first component corresponds to at least one of a data source, a data warehouse, and a processing component of the first external vendor based on the configuration file and the type of the first component comprises, determining the type of the first component indicated in the data pipeline file; and determining that the mappings indicated in the configuration file comprise a first mapping between the type of the first component and the first external vendor.

19. The non-transitory machine-readable media of claim 7, wherein the instructions to determine that the first component corresponds to at least one of a data source, a data warehouse, and a processing component of the first external vendor based on the configuration file and the type of the first component indicated in the data pipeline file comprise instructions to, determining the type of the first component indicated in the data pipeline file; and determining that the mappings indicated in the configuration file comprise a first mapping between the type of the first component and the first external vendor.

20. The apparatus of claim 12, wherein the instructions executable by the processor to cause the apparatus to determine that the first component corresponds to at least one of a data source, a data warehouse, and a processing component of the first external vendor based on the configuration file and the type of the first component indicated in the data pipeline file comprise instructions executable by the processor to cause the apparatus to, determine the type of the first component indicated in the data pipeline file; and determine that the mappings indicated in the configuration file comprise a first mapping between the type of the first component and the first external vendor.

* * * * *